United States Patent [19]

Todd

[11] Patent Number: 4,645,875
[45] Date of Patent: Feb. 24, 1987

[54] TELEPHONE ANSWERING PROGRAMMING DEVICES

[76] Inventor: Leonard M. Todd, 424 W. 119th St., New York, N.Y. 10027

[21] Appl. No.: 3,235

[22] Filed: Jan. 12, 1979

Related U.S. Application Data

[63] Continuation-in-part of Ser. No. 700,109, Jun. 28, 1976, abandoned, which is a continuation-in-part of Ser. No. 88,909, Nov. 12, 1970, abandoned.

[51] Int. Cl.$^4$ ............................................. H04M 1/64
[52] U.S. Cl. ........................................ 379/70; 379/79
[58] Field of Search .................. 179/6 R, 6 AC, 6 C, 179/6 E, 6.13, 6.03; 360/132; 242/55.19 A

[56] References Cited

U.S. PATENT DOCUMENTS

| | | | |
|---|---|---|---|
| 2,815,401 | 12/1957 | O'Dwyer | 179/6 R |
| 3,008,012 | 11/1961 | Proctor | 360/132 |
| 3,344,234 | 9/1967 | Salzberg | 179/6 R |
| 3,445,600 | 5/1969 | Todd | 179/6 R |
| 3,501,592 | 3/1970 | Waldman | 179/6 R |
| 3,524,936 | 8/1970 | Hill | 179/6 E |
| 3,586,779 | 1/1971 | Chernack | 179/6 R |
| 3,590,160 | 6/1971 | Meri | 179/6 R |
| 3,592,968 | 7/1971 | Ogawa | 179/6 R |
| 3,644,682 | 2/1972 | Parilla | 179/100.1 C |
| 3,649,762 | 3/1972 | Okamura | 179/6 R |

FOREIGN PATENT DOCUMENTS

| | | | |
|---|---|---|---|
| 1286306 | 1/1969 | Fed. Rep. of Germany | 242/55.19 A |
| 1547048 | 10/1969 | Fed. Rep. of Germany | 242/55.19 A |
| 1929710 | 12/1969 | Fed. Rep. of Germany | 242/55.19 A |
| 1058253 | 2/1967 | United Kingdom | 179/6 R |
| 1165988 | 10/1969 | United Kingdom | 242/55.19 A |

OTHER PUBLICATIONS

Spratt, Simple Telephone Answering Machine, Wireless World, 7/56, pp. 344-346.

Primary Examiner—Robert L. Richardson

[57] ABSTRACT

Output of an amplifier is continuously coupled to the line during line seizure, not loading the line during standby. Input to a second amplifier is coupled to the line at least during line seizure. An SCR flip-flop provides power to the announcement deck and message deck and may power these decks alternately.

6 Claims, 8 Drawing Figures

TELEPHONE ANSWERING PROGRAMMING DEVICES

This application is a continuation-in-part of Ser. No. 700,109 filed June 28, 1976, and now abandoned, that is a continuation-in-part of Ser. No. 88,909, filed Nov. 12, 1970 for Telephone Answering Devices, now abandoned. This invention is a further development of the Telephone Answering Device of U.S. Pat. No. 3,445,600, issued to me, simplifying construction, reducing costs and increasing reliability. Related applications include U.S. Pat. Nos. 3,794,764 and 3,794,767, Ser. No. 464,626, filed June 28, 1976 and Ser. No. 959,078 filed Nov. 9, 1978, for a Ring Signal Detector, that were all filed pursuant in part to requirements for election of species and restriction made in the applications.

One aspect of cost reduction of this invention is to use two "off-the-shelf" tape recorders, that is, recorders of usual design, with few modifications if any, together with their built in switching, and additional switching means, with ring up signal switch and automatic programming means, to construct a telephone answering set. This object is dealt with in part in U.S. Pat. No. 3,794,767. The principles may be employed with specially designed recorders.

It is an object of this invention to use two cassette tape cartridges having the same or closely similar external dimensions, one for the endless loop tape and the other for reel-to-reel tape for messages to make the construction of tape drives less complex and costly and to provide convenience in storage of recorded tapes.

It is an object of this invention to respond to a ring up signal and establish line service without disturbing or interfering with normal telephone operation and to make only a small change in line termination impedance which is not readily apparent by electrical tests at the Central Office. It is an object of this invention to accomplish this by decoupling the low output impedance of the announcement amplifier from the telephone line that would otherwise place a heavy capacitively coupled impedance on the line, in standby. This aspect of the invention is dealt with in U.S. Pat. No. 3,797,764 and 3,797,767, both continuations-in-part of Ser. No. 88,909.

It is an object of this invention to eliminate most relays from the device through the use of solid state switches, including SCR's and particularly SCR's in a flip-flop arrangement.

This invention will simplify message duration determination by the use of a short impulse from the announcement tape to turn the message tape recorder on and a long impulse to turn the message tape recorder and announcement recorder off, returning the device to standby.

It is another object of this invention to couple the device to the line with the "voice connector—RDM" of the A.T.&T. or to use a telephone pickup coil, amplifier and solenoid handset lifter, or to use magnetic or acoustic coupling to the handset.

This invention may use a modified "Compact Cassette" with endless loop tape to carry the announcement, further permitting the use of standard tape decks. It is an object of this invention to use such an endless loop tape cartridge together with a tape deck employing a "Compact Cassette" with reel-to-reel tape for the message recorder as shown to simplify construction and to increase convenience of operation. The sensing tape switch contacts or other switching means may be enclosed within the cassette or cartridge, enabling the use of simple low cost recorders, or be incorporated in the deck. This object may be accomplished similarly with other endless loops of usual design similarly modified, such as auto stereo cartridges and the Cousino tape vendor.

It is an object of this invention to use a two amplifier circuit to couple the announcement recorder output to the line with a switching device to furnish a d.c. path for line seizure, removing the low impedance of the announcement amplifier output from the line during standby and with the message recorder input coupled to the line either before or after the switching device, that does not affect line termination impedance because of the high impedance of the message recorder input; this is an improvement over the circuit of U.S. Pat. No. 3,445,600 and is disclosed in part in U.S. Pat. Nos. 3,794,764 and 3,794,767.

BRIEF DESCRIPTION OF THE DRAWINGS

With record pushbutton in the released position, FIG. 7B, the recorder is in "play" condition and the erase head is deactivated.

Figure 1:
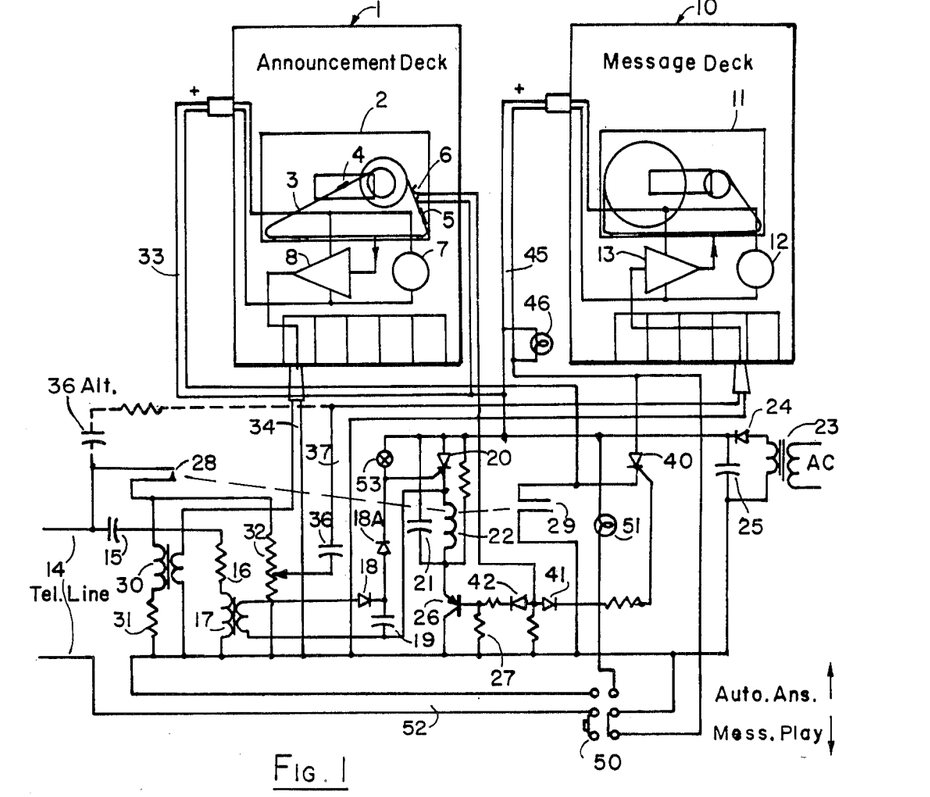
FIG. 1 is an arrangement of two cassette tape recorders with telephone line coupling, SCR-relay-transistor line seizure and timing arrangement and additional switching for automatic answer and message playback, including the coupling of the announcement amplifier output to the line after the line seizure switch and the coupling of the message recorder input to the line before or after the line seizure switch.

In FIG. 1 announcement deck 1 contains endless loop cassette 2, endless tape 3, short length of sensing tape 4, long length of sensing tape 5, sensing tape contacts 6 fixedly mounted to the inner surface of cassette 2, motor 7 and amplifier 8. As noted in U.S. Pat. No. 3,445,600, other impulse generating elements may be used on the tape with other impulse sensitive transducers in the deck.

In keeping with these principles, all sensing for the impulse generating elements may be from cueing tones on the tape to the record/play head of the announcement recorder that is evident from this disclosure and from U.S. Pat. No. 3,445,600, Re. 29,655.

Message record deck 10 contains standard reel-to-reel cassette 11, motor 12 and amplifier 13. A ring up signal from telephone line 14 is coupled to the gate of SCR 20 through capacitor 15, resistor 16, transformer 17, diode 18 and capacitor 19, causing SCR 20 to latch on with current supplied from transformer 23, diode 24 and capacitor 25. Current then flows through relay coil 22 and transistor 26 which is held normally on by resistor 27. Relay contacts 28 and 29 then close. Line seizure is established through the primary of transformer 30 and resistor 31. Prior to ring up, the network 15, 16, 17 together with the low triggering power requirement of the gate of SCR 20 presents a high impedance to the line.

Announcement deck 1, with switches set for playback, starts with current flowing from power supply through contacts 29 over leads 33 to motor 7 and amplifier 8, the output of which goes through leads 34, and transformer 30 carrying the announcement to the telephone line and to the caller.

At the conclusion of the announcement, short length of sensing tape 4 closes sensing tape switch 6 sending a short impulse to diode 41 and the gate of SCR 40, latching the SCR on, causing the message record deck 10 to start, with its switches set for record. Current flows from power supply through leads 45 to motor 12, amplifier 13, SCR 40 and closed contacts 29. Lamp 46 lights.

The caller may leave his message which passes from line 14 through control 32, capacitor 36, leads 37 to the input of message record amplifier 13 and thence to the tape in cassette 11.

At the conclusion of the message, determined by the length of tape 3 between sensing tapes 4 and 5, sensing tape 5 crosses sensing tape switch 6 sending a long impulse through diode 42 to the base of transistor 26 causing it to cease conduction for the duration of the long impulse. Current then flows from capacitor 21 through SCR 20 and relay coil 22, and resistor in parallel. In the time required for the capacitor to discharge, which is determined by its value, say 0.3 seconds, relay 22 opens releasing contacts 28, releasing line seizure, releasing contacts 29, stopping the recorders and current falls below the holding level of SCR 20, causing it to unlatch. The device is now in standby automatic answering condition.

Switch 50 in automatic answering position closes ready leads 52 allowing flow through the telephone line 14 and lamp 51 lights. In message playback position, ready leads 52 are opened and lamp 51 is extinguished; SCR 40 and contacts 29 are shunted by switch 50, permitting message tape rewind and playback through message deck speaker.

To record an announcement, switch 50 is set in message playback position and a microphone (not shown) is inserted into the input jack (not shown) of deck 10. Announcement deck 1 is set in record by its pushbuttons and momentary contact switch 53 is then actuated. This fires SCR 20 in the same way a ring up signal would and announcement deck 1 starts through its automatic answer cycle. The recorded announcement may be timed by observing a watch or to see sensing strip 4 pass the cassette window, and should slightly overrun switch-on of message deck 10. Sensing tape 5 will turn the announcement deck 1 off at the conclusion of the message period; as the message duration period is approached, switch 50 is placed in automatic answer until turn off occurs, indicated by lamp 46 going out, and then returning switch 50 to playback. This procedure may be simplified with small circuit refinements.

To check the announcement, announcement deck 1 is set in playback by its pushbuttons and actuating momentary contact switch 53 again. The deck may be turned off as the end of the message duration period is approached by briefly placing switch 50 in automatic answer until turn off occurs.

As a first step in simplifying the switching, the record-play switch of many recorders on the market have spare contacts which may be used to replace switch 50. By the addition of suitable switching, push-buttons may be provided for automatic answer, message tape rewind, message playback, announcement record and announcement check, and such rearrangement is applicable to all of the circuits shown herein.

With appropriate changes such as providing additional contacts on the relay and replacing SCR 40 with a triac, a.c. operated transistorized recorders may be used.

Figure 2:
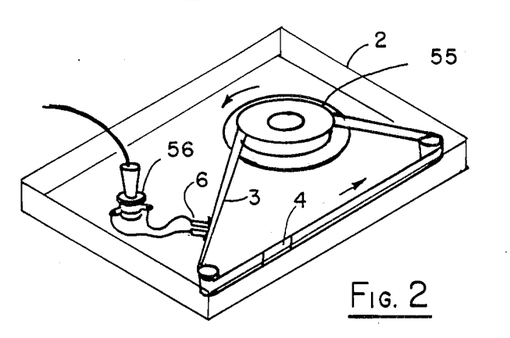
FIG. 2 is a view of the modified cassette with endless loop that may be capstan driven, with internal contacts mounted on an inner surface of the cassette housing and plug and jack for connection of the contacts to external circuits.

In FIG. 2, compact cassette case 2 houses modified endless loop hub 55; lubricated magnetic tape 3 coils on the outside of the hub and is withdrawn from the inside of the coil. Sensing tape contacts 6 are shown at the outer portion of tape as it is withdrawn from the coil, but these contacts may be located anywhere along the exposed length of tape to contact either the inner or outer face of the tape. Placing the sensing tape on the outer face of the tape makes the cassette compatible with recorders with self-contained sensing tape switches. This principle of self-contained contacts within an endless tape cartridge may be applied to four and eight track stereo cartridges, Playtape cartridges and the Cousino tape vendor. The latter is generally applicable to any open reel-to-reel recorder. Jack 56 allows connection to external apparatus.

Figure 3:
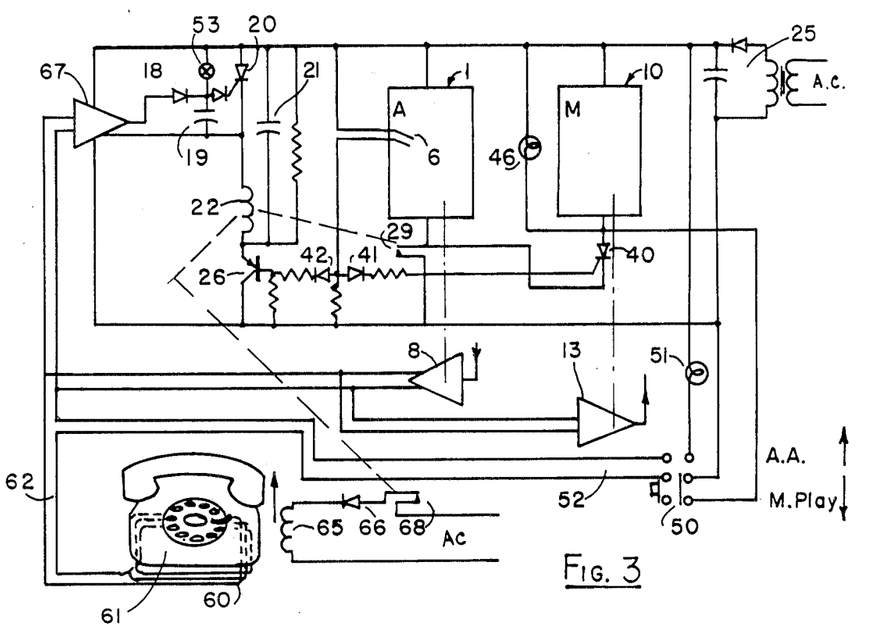
FIG. 3 is a short and long tape length system for message duration determining and automatic programming, induction pick up coil and solenoid handset lifter.

FIG. 3 shows a telephone set 61 inductively coupled by pick-up coil 60 to the answering device using a line-powered solenoid handset lifter 65, which is permitted by the tariffs and is not normally detectable at the central office. A ring signal is inductively coupled to coil 60 and transmitted over leads 62 to ring amplifier 67 to which power is furnished by power supply 25. The amplified ring signal is rectified and filtered by diode 18 and capacitor 19 and applied to the gate of SCR 20, latching the SCR on in the same manner as in the circuit of FIG. 1. Coil 22 is energized through normally on transistor 26 and contacts 29 and 68 close. Solenoid 65 is energized by rectified d.c. through diode 66, lifts the handset and establishes line seizure. The cycle is thereafter similar to the FIG. 1 cycle. At the conclusion of the message period, a pulse to transistor 26 unlatches relay 22 and opens contacts 29 and 68, restoring the handset to the cradle and the device is standby. Amplifier 8 is coupled to the coil 60 and coil 60 is coupled to the input of amplifier 13 in a similar manner to coupling to the telephone line in FIG. 1. Automatic answer, message rewind and playback, announcement record and check are also similar to these operations for FIG. 1.

Figure 4:
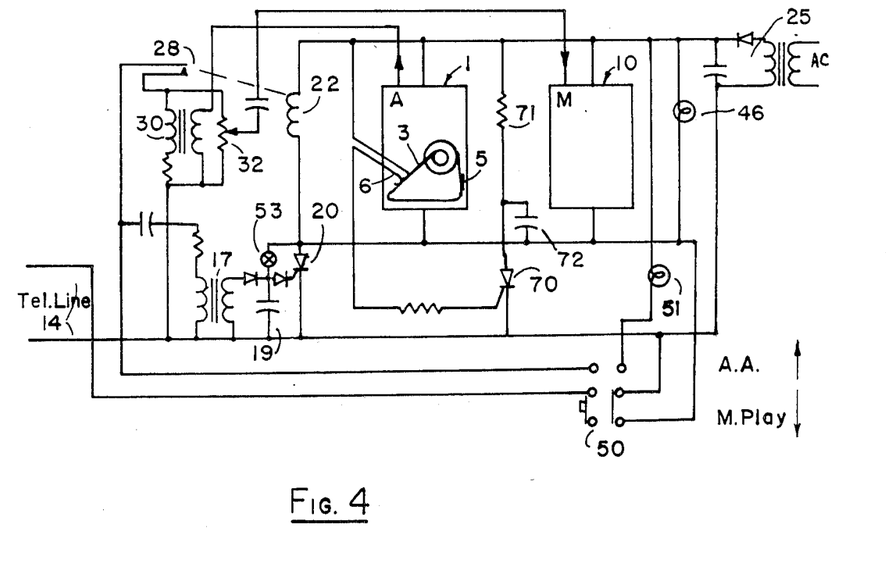
FIG. 4 is an arrangement using one tape length to determine message duration and the automatic answering cycle in which both the announce and message decks are on throughout the cycle, using an SCR flip-flop for turn-off.

In FIG. 4, the device is simplified by causing the announcement and record decks 1 and 10, to go on and off simultaneously, starting at ring up and stopping at the conclusion of the message period determined by the length of the tape and sensing tape 5. A ring up signal goes to transformer 17, is rectified, filtered and applied to the gate of SCR 20 which latches on, turning on relay 22, announcement deck 1 and message deck 10. Contacts 28 of relay 22 close, establishing line seizure. When sensing tape 5 crosses sensing tape switch 6, an impulse is sent to the gate of SCR 70 causing it to hold momentarily, permitting the charge on capacitor 72 which had accumulated through resistor 71, to discharge into SCR 20 causing turn-off of SCR 20 and deenergizing of relay 22, opening contacts 28. Line seizure is released and the device is restored to standby automatic answer. The auxiliary functions of rewind, message playback, announce record and check are performed in a fundamentally similar manner to those previously described.

For message rewind and playback, switch 50 is placed in playback position and rewind or playback buttons of message deck 10 are depressed. For announcement record and check, record or playback buttons of announcement deck 1 are depressed; switch 50 is in playback position. Switch 53 is momentarily actuated, starting deck 1 so that the announcement may be recorded or played back. As the conclusion of the message period approaches, switch 50 is placed in automatic answer until turn-off occurs, indicated by lamp 46 going out and then returning switch 50 to playback. This procedure may be simplified with small circuit refinements.

Figure 5:
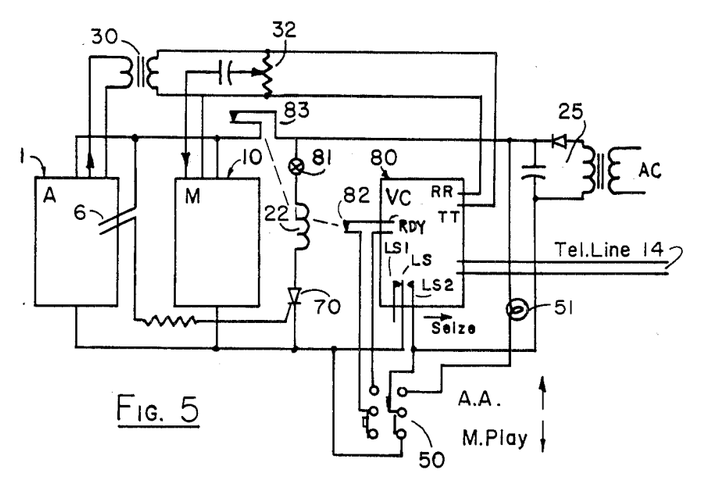
FIG. 5 shows a circuit in which two tape decks are on throughout the cycle, coupled to the line through the A.T.&T. "voice-connector—RDM", using a relay and SCR for turn-off.

FIG. 5 shows the circuit of FIG. 4 adapted for use with the A.T.&T. "voice connector—RDM" which differs somewhat from the "Recorder coupler" described in U.S. Pat. No. 3,445,600. The latter is now entitled "voice connector—RDL". Telephone line 14 is coupled to output terminals RR and TT which are then coupled to announce and message decks 1 and 10 through control 32 and transformer 30. When ready terminals "RDY" of the voice connector are closed through normally closed contacts 82 of relay 22, with switch 50 in automatic answer position, and a ring up signal is received, line seizure occurs within the connector, contact LS closes to LS 2 and current flows from supply 25 to announce and message decks 1 and 10. At the conclusion of the message record period, sensing tape 5 crosses sensing tape switch 6 giving an impulse to the gate of SCR 70 which latches on, energizes relay 22, and opens relay contacts 82 and 83, which remain open. Current flow to the recorders is now stopped by open contacts 83. After about 2 seconds, voice connector contacts LS and LS2 open, stopping current to SCR 70 and relay 22, which then unlatch and deenergize, closing contacts 82 and 83. The machine is now in standby and the cycle is repeated when another call is received.

For message rewind and playback, switch 50 is placed in message playback position and announce deck 1 is placed in "stop" or off position, inactivating the sensing tape switch. For announcement record and check, either the record or play buttons of deck 1 are depressed, the microphone is inserted into the proper jack, the output plug to transformer 30 and the voice connector is removed, and announce check can be heard over the speaker. When one cycle of announce record or check is completed, normally closed contacts 83 open and remain open, stopping the decks. Another cycle of record or check is started by actuating normally closed momentary contact switch 81, unlatching SCR 70, deenergizing relay 22 and reclosing contacts 83.

Figure 6:
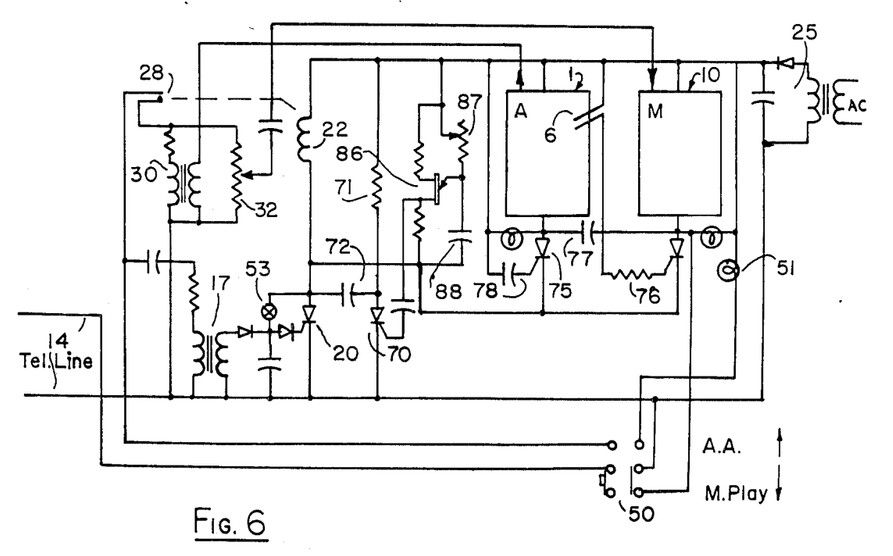
FIG. 6 is a circuit using a unijunction transistor to time the automatic answering cycle, one SCR flip-flop pair to turn the announce deck off and the message deck on, and another SCR flip-flop pair to turn the device off and release line seizure.

In the circuit of FIG. 6, duration of announcement and message is determined by unijunction transistor 86. A ring signal in telephone line 14 latches SCR 20, energizes relay 22 and causes line seizure through contacts 28. Voltage is then applied to the unijunction transistor circuit which starts to charge capacitor 88, preliminary to firing in the time determined by the setting of variable resistor and the value of capacitor 88. The application of voltage across deck 1 and SCR 75 causes a firing impulse through capacitor 78 to the gate of SCR 75 which latches on, starting announce deck 1. The endless tape in deck 1 is sufficient for the announcement and terminates in sensing tape 5. When this crosses sensing tape switch 6, an impulse is sent to the gate of SCR 76 causing it to latch on and turn off SCR 75 by discharging previously charged capacitor 77 backwards through SCR 75. Message deck 10 is simultaneously turned on. When unijunction time delay circuit fires, it sends an impulse to the gate of SCR 70 which holds briefly, discharging capacitor 32, turning SCR 20 off, deenergizing relay 22, opening contacts 28 and releasing line seizure. SCR's 20 and 70 and 75–76 comprise SCR flip-flops.

For message rewind and playback, switch 50 permits current flow to deck 10. For announcement record and check, momentary contact switch 53 is actuated which starts announce deck 1 through its cycle. Message deck push buttons should be in the off position. When the end of the message period approaches, switch 50 is placed briefly in automatic answer until u.j.t. 86 fires, terminating the cycle, and then 50 is restored to playback.

Many variations and permutations are possible within the spirit of this invention. More sophisticated switching will enable automatic answer and message rewind and playback to be selected with less complexity. In addition to flip-flops, shift registers may be used in various combinations in the programming circuits. Regenerative pair transistors can replace SCR's in some applications. Transistor capacitor charging circuits may replace the UJT circuit. Darlington pair transistors may be used to actuate relays.

There are several basic timing arrangements. The announcement tape may be the timing medium for turning off both announce and message decks at the conclusion of message. The announcement tape may turn on the message recorder at the conclusion of the announcement and turn off both announce and message decks at the conclusion of message. The duration of message may be determined by a time delay means which starts at line seizure, or by time delay means which starts at the conclusion of the announcement and start of message recorder. This invention resides in the use of solid state circuits, SCR flip flops and the like to cause the switching and timing rather than by the use of relays.

In the use of two tape recorders as shown herein, both units may be housed together with power supply, automatic programmer and auxiliary switching in one case, with controls and cassettes open to view and unnecessary controls such as the rewind and fast forward of the announce deck either concealed or deleted.

For convenience in understanding operation, the record/play switches in announcement deck 1 and message deck 10, that are coupled to the manual control pushbuttons, are not shown in FIG. 1 and the wiring shown indicates the connections made by the record/play switches set in automatic answer, with the appropriate pushbuttons actuated.

Figure 7A:
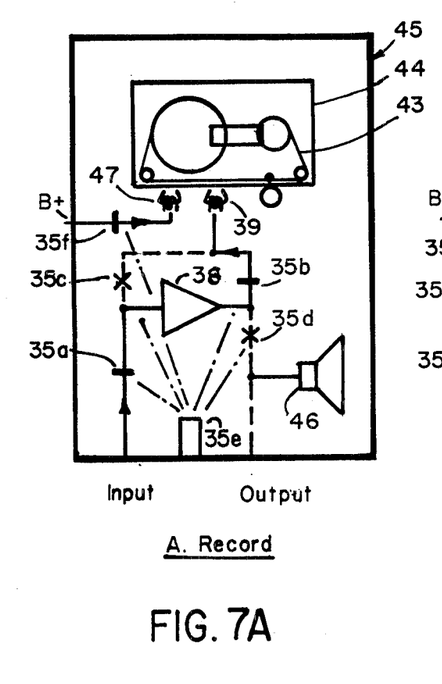
FIGS. 7A and 7B show a typical arrangement of a record/play switch that, when the appropriate pushbutton is depressed for "record", reverses the amplifier input and output connections and activates the erase head.

In FIG. 7A a typical tape recorder deck 45 is shown (corresponding with decks 1 and 10) with record/play switch 35a-35f in "record" condition with record pushbuttons 35e depressed, closing switches 35a-35b, and 35f and c opening switches 35c-35d. In "record", the input jack is coupled to the input of amplifier 38 and the output of amplifier 38 is coupled to the record/play head 39, causing the input electrical sound signal to be amplified and recorded on magnetic tape 43 when the deck is operated. Switch 35f energizes erase head 47 to erase previously recorded material. (This is not essential to understanding programmer operation).

Figure 7B:
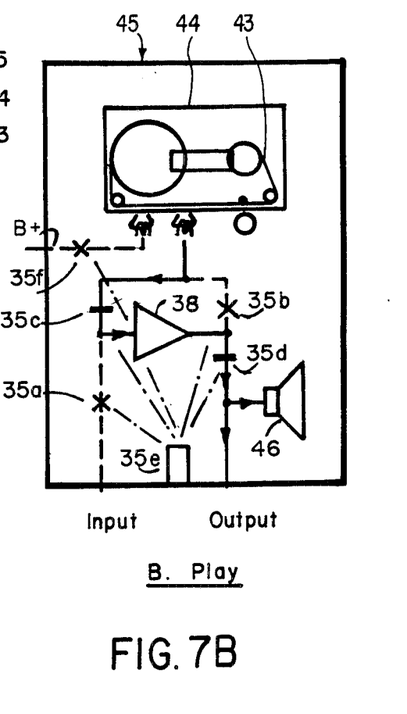

In FIG. 7B, in "play" condition, record pushbutton 35a is released, closing switches 35c-35d and opening switches 35a, 35b and 35f. Record/play head 39 is coupled through switch 35c to input of amplifier 38 and output of amplifier 38 is coupled to deck output and speaker 46 through switch 35d. In this condition when the deck is operated, recorded material is played back to output and speaker 46.

This circuit is widely employed in recorders; the record/play switch also alters record/play frequency response, adds bias and matches impedance in record. Various forms of tape may be used including open and cassette reel-to-reel and endless loop cassettes.

As may be seen from the description of the tape decks, the controls may be pushbutton, rotary dial or lever types without affecting the principles of the invention. The principle of the two cassette invention may be applied to specially constructed recorders as well as the two identical cassette recorders shown. The term "Compact Cassette" is an unregistered trademark of the North American Philips Company, Inc., applied to interchangeable magnetic tape cartridges and this term is generally employed in the electronics industry. The construction of the reel-to-reel magnetic tape cartridge 11 (cassette) in FIG. 1 is the subject of U.S. Pat. No. 3,394,899 based on an earlier (1966) German convention application. The endless loop "Compact Cassette" is the subject of U.S. Pat. No. 3,653,601 to U.S. Philips Corp. based on earlier (1966) German convention applications, and other patents, and in this invention is modified at least by the addition of signal generating means on magnetic tape 3 FIG. 1 typically sensing tape 5 with switching responsive means either in the deck or fixedly mounted to and incorporated within the cassette housing, with leads to connect the switching responsive element to external equipment.

In FIG. 2 leads, plug and jack are shown for connection of sensing tape switch 6 to external circuits. Servicing of the device is simplified from the construction with sensing tape switch mounted in the deck. It should be noted that sensing tape contacts and tape on the graphite lubricated side of the tape may produce difficulty because of the relatively low resistivity of the graphitesurface and this should be dealt with.

Capstan drive is usually employed in cassette recorders but other types of drive such as rim or hub drive may be employed.

It will be understood that other methods of message duration timing than that shown herein may be employed including voice actuation by the caller or signals or line voltage change caused by the caller hanging up or the like.

The message record amplifier input coupled to the line load impedance has no effect whatever on telephone line termination impedance in standby. The input of amplifer 13 coupled directly to the line has no substantial effect on termination impedance because of the high impedance of the input.

The output circuit of the announcement amplifier 8 has a relatively low impedance so that in this invention it is coupled to the line following the line seizure switch and accordingly does not load the line capacitively during standby. This is a simple way of achieving the objective and may be attained by other switching means to remove the amplifier impedance from the line during standby within the spirit of this invention: In the circuit of FIG. 3 of U.S. Pat. No. 3,445,600, both the announcement amplifier output and the message amplifier input are continuously coupled to the line, so that the announcement amplifier output places a relatively heavy capacitive load on the line during standby; this tends to interfere with service at least by causing some voice attenuation during standby when an associated telephone set is used and is detectable at the Central Office.

In FIG. 1 the connection of the input of amplifier 13 through capacitor 36 to line load impedance 30-31 is shown in heavy lines and operation is described above. Note record/play switch in FIG. 7A. The alternate construction is shown by dotted line from the upper lead of telephone line 14 through capacitor 36 Alternate to the upper lead going to the input plug of message deck 10; in this case, the left line of pair 37 to capacitor 36 (solid lines) is disregarded. With the connection directly to the line (record/play switch as in FIG. 7A), the input from the telephone line is independent of the condition of the line seizure switch. This connection is also described in U.S. Pat. No. 3,794,767, FIGS. 2-6. In this invention, the markedly simplified switching and cost reduction of the invention of U.S. Pat. No. 3,445,600, Re. 29,655 is retained with the added advantage of lightly loaded line described above.

In the claims "announcement reproducing means" and "message tape recording means" means a tape recorder or tape deck, having an amplifier or connection for an external amplifier, a tape transport and controls therefor, record/play and erase heads, mechanical linkage for engaging the tape and heads, and may include a loudspeaker and microphone for announcement record and check and message playback, and a record/play switch.

In the claims, "coupling means to couple signals in said telephone line to said input of said amplifier" refers generally to connections to the input of this amplifier, either directly from the telephone line, from the line load impedance where signals appear only during line seizure, from capacity coupled transformers connected to the telephone line, or the like. None of these constructions places an appreciable load on the telephone line during standby.

Typical units include open reel-to-reel, reel-to-reel cartridge or cassette recorders or players, endless tape stereo or mono cartridge recorders or players, Playtape or the like or merely tape transports plus necessary components for record and playback.

The record/play head of "announcement reproducing means" in play condition is coupled to the input of an amplifier and the amplifier output is coupled to the telephone line, both through manually set switches; in operation this delivers a recorded announcement to the line.

The telephone line is coupled to the input of an amplifier of "message tape recording means" with the output of the amplifier coupled to the record/play head of the recording means both through manually set switches; in record condition and in operation, messages from the line are amplified and recorded on the tape.

Reference is made herein to Disclosure Document No. 120 filed July 17, 1969, pertaining to this invention.

I claim:

1. A telephone answering device coupled to a telephone line for reproducing an announcement and recording messages comprising a first tape recorder, an endless magnetic tape within said first tape recorder, a first short length of sensing tape on said endless tape located approximately at the conclusion of said announcement, a second longer length of sensing tape on said endless tape located at the conclusion of a message, a sensing tape switch adjacent said endless tape, a second tape recorder, first switching means latching on receipt of a ring up signal to establish line seizure and to start said first tape recorder, second switching means latching in response to a short impulse caused by the passage of said first short length of sensing tape across said sensing tape switch and starting said second tape recorder, third switching means activated by a longer impulse caused by the passage of said second longer length of sensing tape across said sensing tape switch to unlatch said first switching means, to release line seizure, to stop said first tape recorder and to unlatch said second switching means and stop said second tape recorder, restoring said device to standby condition.

2. A telephone answering device connected to a telephone line for reproducing an announcement and recording messages, each of said messages being recorded for a message period having a start and a conclusion, comprising endless tape announcement reproducing means, a length of endless tape within said endless tape announcement reproducing means, said length of tape rotating when said endless tape announcement reproducing means is turned on, said length of endless tape containing an announcement portion and a message duration timing portion, said announcement portion having a start and a conclusion, a first impulse generating element of short duration located on said endless tape approximately at said conclusion of said announcement, a second impulse generating element of relatively longer duration located on said endless tape approximately at said conclusion of said message duration timing portion, impulse sensitive means adjacent said endless tape, message tape recording means, first bistable switching means having a resting and a latched condition, second bistable switching means having a resting and a latched condition, unlatching means connected to said first and second bistable switching means, said first bistable switching means connected to said telephone line and said endless tape announcement reproducing means, said second bistable switching means connected to said message tape recording means, a ring signal received in said telephone line actuating said first bistable switching means into said latched condition and starting said endless tape announcement reproducing means, and rotating said endless tape, said first short impulse generating element passing said impulse sensitive means at said conclusion of said announcement causing said second bistable switching means to latch and to start said message tape recording means, at said conclusion of said message period, said longer impulse generating element passing across said impulse sensitive means, generating a longer impulse, actuating said unlatching means, said unlatching means then unlatching said first and second bistable switching means, releasing line seizure, stopping said endless tape announcement reproducing means and stopping said endless tape, stopping said message tape recording means and restoring said answering device to standby.

3. A telephone answering device connected to a telephone line for reproducing an announcement and recording messages comprising endless tape announcement reproducing means, message tape recording means, first and second amplifiers, each of said first and second amplifiers having an input and an output, automatic programming means, when in automatic answering condition adapted to respond to an incoming ring signal in said telephone line and in ordered sequence to establish line seizure, to start and stop said announcement reproducing means, to start said message tape recording means and at the conclusion of a message period to stop said message tape recording means and to release line seizure, first and second manual switching means, third switching means and a line load impedance, said first manual switching means in said automatic answering condition coupling said telephone line to said input of said first amplifier and said output of said first amplifier to said message tape recording means, said second manual switching means in said automatic answering condition coupling said announcement reproducing means to said input of said said second amplifier and said output of said second amplifier to said line load impedance, said third switching means in series with said line load impedance across said telephone line, actuated by said automatic programming means to operate and conduct upon receipt of said ring signal, to provide a d.c. path for said telephone line and establish line service; at the conclusion of said message period, said automatic programming means causing said third switching means to open said d.c. path and release line seizure.

4. A telephone answering device connected to a telephone line for reproducing an announcement and recording messages, each of said messages having a start and a conclusion, comprising endless tape announcement reproducing means, message tape recording means, automatic programming means when in automatic answering condition adapted to respond to an incoming ring signal in said telephone line and in ordered sequence to establish line seizure, to start and stop said announcement reproducing means, to start said message tape recording means and at the conclusion of a message period to stop said message tape recording means and to release line seizure, an SCR flip-flop including first and second SCR's, a capacitor coupling said SCR's, a power source and message duration determining means, said endless tape announcement reproducing means and said message tape recording means connected in series with said power source and said first SCR upon receipt of said ring signal, said automatic programming means establishing line seizure and causing said first SCR of said flip-flop to go into conduction and turning on power to said announcement reproducing means and to said message tape recording means; at said conclusion of said message period, said message duration determining means giving an impulse to said second SCR that thereupon turns on and commutates said first SCR with said capacitor, turning off power to said endless tape announcement reproducing means and said message tape recording means and causing said automatic programming means to release line seizure.

5. A telephone answering device connected to a telephone line for reproducing an announcement and recording messages, each of said messages having a start and a conclusion, comprising endless tape announcement reproducing means, message tape recording means, automatic programming means when in automatic answering condition adapted to respond to an incoming ring signal in said telephone line and in ordered sequence to establish line seizure, to start and stop said announcement reproducing means, to start said message tape recording means and at the conclusion of a message period to stop said message tape recording means and to release line seizure, an SCR flip-flop including first and second SCR's, a capacitor coupling said SCR's, a relay having a coil and contacts, a line load impedance, a power source and message duration determining means, said endless tape announcement reproducing means, said message tape recording means and said relay coil connected in series with said power source and said first SCR, said line load impedance and said contacts connected in series across said telephone line, upon receipt of said ring signal, said automatic programming means causing said first SCR of said flip-flop to go into conduction and turning on power to said announcement reproducing means, to said message tape recording means and energizing said relay coil; said contacts closing, providing a d.c. path for said telephone line current through said line load impedance and establishing line seizure; at said conclusion of said message period, said message duration determining means giving an impulse to said second SCR that thereupon turns on and commutates said first SCR with said capacitor, turning off power to said endless tape announcement reproducing means and said message tape recording means and deenergizing said relay coil, opening said contacts and releasing line seizure.

6. A telephone answering device connected to a telephone line for reproducing an announcement and recording messages, each of said messages having a start and a conclusion, comprising endless tape announcement reproducing means, message tape recording means, automatic programming means when in automatic answering condition adapted to respond to an incoming ring signal in said telephone line and in ordered sequence to establish line seizure, to start and stop said announcement reproducing means, to start said message tape recording means and at the conclusion of a message period to stop said message tape recording means and to release line seizure, means to provide power to said endless tape announcement reproducing means and to said message tape recording means, an SCR flip-flop including first and second SCR's, a capacitor coupling said SCR's, a power source and message duration determining means, said endless tape announcement reproducing means in series with said first SCR, said message tape recording means in series with said second SCR, said announcement reproducing means and said first SCR and said message tape recording means and said second SCR connected in parallel, said parallel combination in series with said means to provide power and said power source, upon receipt of said ring signal, said automatic programming means establishing line seizure, enabling said means to provide power and causing said first SCR to go into conduction, causing said announcement reproducing means to operate and transmit an announcement to said telephone line, at the conclusion of said announcement, said automatic programming means giving an impulse to said second SCR, commutating said first SCR and turning off said announcement reproducing means and turning on said message tape recording means to record a message from said telephone line; at said conclusion of said message period, said message duration determining means causing said automatic programming means to turn off said means to provide power and to stop said announcement reproducing means and said message tape recording means, and to release line seizure, restoring said device to standby.

* * * * *